(12) United States Patent
Nikles et al.

(10) Patent No.: US 11,337,013 B2
(45) Date of Patent: May 17, 2022

(54) HEARING AID, HEARING AID SET AND HEARING AID MODULE

(71) Applicant: Sivantos Pte. Ltd., Singapore (SG)

(72) Inventors: Peter Nikles, Erlangen (DE); Martin Schmidt, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/123,424

(22) Filed: Dec. 16, 2020

(65) Prior Publication Data

US 2021/0195349 A1 Jun. 24, 2021

(30) Foreign Application Priority Data

Dec. 19, 2019 (DE) .......................... 102019220300.0
Jul. 1, 2020 (DE) .......................... 102020208233.2

(51) Int. Cl.
*H04R 25/00* (2006.01)
*H02J 50/10* (2016.01)

(52) U.S. Cl.
CPC ............ *H04R 25/602* (2013.01); *H02J 50/10* (2016.02); *H04R 25/552* (2013.01); *H04R 25/609* (2019.05); *H04R 2225/31* (2013.01)

(58) Field of Classification Search
CPC .. H04R 2225/31; H04R 25/554; H04R 25/55; H04R 2225/33; H04R 25/602; H04R 25/609; H02J 7/00; H02J 7/00034; H02J 50/10

USPC .................................................. 381/323–324
See application file for complete search history.

(56) References Cited

U.S. PATENT DOCUMENTS

| | | | |
|---|---|---|---|
| 2016/0363550 A1* | 12/2016 | Koo ........................ | H04W 4/80 |
| 2018/0027343 A1 | 1/2018 | Dobson et al. | |
| 2018/0359576 A1* | 12/2018 | Nikles ...................... | H01Q 7/08 |
| 2019/0222944 A1* | 7/2019 | Jurg ........................ | H04R 25/55 |
| 2019/0261100 A1 | 8/2019 | Troelsen et al. | |

FOREIGN PATENT DOCUMENTS

DE 102018217468 A1 9/2019

\* cited by examiner

*Primary Examiner* — George C Monikang
(74) *Attorney, Agent, or Firm* — Laurence A. Greenberg; Werner H. Stemer; Ralph E. Locher

(57) ABSTRACT

A hearing aid has a hearing aid module for supplying electrical energy and has a transmitting and receiving unit for communication with another device. The hearing aid module has an accumulator and a charging circuit for charging the accumulator. The charging circuit is formed for contactless, in particular inductive, charging of the accumulator. The hearing aid module further has a charging conductor loop. The transmitting and receiving unit has a radio conductor loop and the radio conductor loop is integrated into the hearing aid module.

18 Claims, 4 Drawing Sheets

HEARING AID, HEARING AID SET AND HEARING AID MODULE

CROSS-REFERENCE TO RELATED APPLICATION

This application claims the priority, under 35 U.S.C. § 119, of German Patent Applications DE 10 2019 220 300, filed Dec. 19, 2019 and DE 10 2020 208 233, filed Jul. 1, 2020; the prior applications are herewith incorporated by reference in their entirety.

BACKGROUND OF THE INVENTION

Field of the Invention

The invention relates to a hearing aid. It also relates to a binaural hearing aid set with two corresponding hearing aids and, moreover, a hearing aid module for such a hearing aid.

Typically, classic assistive listening devices that are used to provide care for the hard of hearing, are referred to as hearing aids. In a broader sense, however, this term also describes, for example, devices that are formed to support people with normal hearing. Such hearing aids are also referred to as "Personal Sound Amplification Products" or "Personal Sound Amplification Devices" ("PSAD" for short). These are not intended to compensate for hearing loss, but are used specifically to support and improve normal human hearing in specific hearing situations, e.g., to support hunters on the hunt or to support animal observation, to be able to better perceive animal sounds and other sounds produced by animals, to support sports reporters, to enable an improved speaking and/or speech understanding in complex background noise, to support musicians, to reduce the stress on hearing, etc.

Regardless of the intended purpose, a hearing aid typically has, among other things, an input transducer, signal or data processing equipment, which usually comprises an amplifier, and an output transducer as essential components. The input transducer is typically formed by an acousto-electric transducer, that is to say for example, a microphone, and/or by an electromagnetic receiver, for example an induction coil. An electro-acoustic transducer is usually used as the output transducer, for example a miniature loudspeaker (also referred to as a "receiver") or an electromechanical transducer, for example a bone-conduction receiver, and the signal processing equipment is usually implemented by an electronic circuit implemented on a printed circuit board.

BRIEF SUMMARY OF THE INVENTION

Starting from this, the invention is based on the object of specifying an advantageously formed hearing aid, an advantageously formed hearing aid set and an advantageously formed hearing aid module.

According to the invention this object is achieved by a hearing aid with the features of the independent hearing aid claim, by a hearing aid set with the features of the independent hearing aid set claim as well as by a hearing aid module with the features of the independent hearing aid module claim. Preferred further developments are contained in the dependent claims. The advantages and preferred configurations set forth with regard to the hearing aid can also be applied analogously to the hearing aid set and/or to the hearing aid module and vice versa.

A hearing aid according to the invention, which is typically formed in the manner of an above-described hearing aid, is preferably part of a binaural hearing aid set according to the invention and has a hearing aid module according to the invention. The hearing aid module according to the invention is especially formed to supply electrical energy to the hearing aid, so that it can also be referred to as a power module, accumulator module or accumulator pack. Furthermore, the hearing aid has a transmitting and receiving unit for communication with another device, preferably with a further hearing aid and in particular with a further hearing aid of the hearing aid set.

The transmitting and receiving unit is typically formed for communication in the near field area and in particular as a so-called magnetically inductive radio system. That is to say, the transmitting and receiving unit is preferably configured for communication with a further device, which is located at a distance less than 15 m, more preferably less than 10 m, and particularly less than 0.5 m from the hearing aid. The radio frequency, base frequency or carrier frequency $f_{radio}$ utilized for the communication of the transmitting and receiving unit is preferably in the range of 500 kHz to 300 MHz and more preferably in the range of 1 MHz to 50 MHz.

The hearing aid module has, inter alia, an accumulator and a charging circuit for charging the accumulator as essential components. The charging circuit in turn has a charging conductor loop and is formed for contactless, in particular inductive, charging of the accumulator. The radio frequency, base frequency or carrier frequency of the electromagnetic radiation utilized for charging is preferably in the range of 20 kHz to 100 MHz, more preferably in the range of 50 kHz to 50 MHz and in particular in the range of 100 kHz to 30 MHz.

Furthermore, the transmitting and receiving unit has a radio conductor loop and the radio conductor loop is integrated into the hearing aid module. In this case, the hearing aid is preferably designed in such a way that $f_{charging}$ is smaller than $f_{radio}$. In this case, the ratio $f_{radio}/f_{charging}$ is preferably in the range 10 to 100 and in particular in the range 20 to 50.

Independently of the above, a quite compact structure is typically implemented in a hearing aid according to the invention and, in particular, an at least partially modular structure is implemented with the aid of the hearing aid module. A corresponding hearing aid module is usually prefabricated and installed as part of a final assembly of the hearing aid. In the case of most of the embodiment variants, the hearing aid module has a type of housing or carrier unit for the other components, parts or assemblies of the hearing aid module. This kind of housing or this kind of carrier unit then typically has a number of fixing elements for the mechanical fixing of the hearing aid module in the hearing aid as well as typically a number of connecting elements, for example terminal contacts, for electrical connection of the hearing aid module with other components in the hearing aid.

In this case, depending on the embodiment variant, the accumulator forms such a housing or such a carrier unit. According to an alternative configuration, the hearing aid module has a base body as a housing or carrier unit, which base body is formed, for example, as a type of hollow body. Typically, the accumulator of the hearing aid is arranged and/or fixed in or at such a base body. In addition, parts of the charging circuit are preferably accommodated in the base body and/or fixed to the base body.

If the hearing aid module has an aforementioned base body, then said base body is preferably made of a ferrimagnetic, in particular a soft magnetic ferrimagnetic material or has a structure or component made of such a material. In this case, the base body is made of a ferrite, for example. The magnetic permeability $\mu_{base\ body}$ of a corresponding aforementioned base body is preferably in a range between 5 and 300, and more preferably in a range between 5 and 100.

Independently, such a base body typically extends along a central longitudinal axis and is, for example, configured in the shape of a cylinder, that is to say, for example, as a cylindrical hollow body.

According to one embodiment variant, the radio conductor loop is further arranged in such a way that said radio conductor loop runs in a circumferential direction about the central longitudinal axis and about the base body and/or the accumulator. In addition, depending on the embodiment variant, the radio conductor loop is configured as a coil with several windings, that is to say, as a cylinder coil.

A configuration is also favorable in which the charging conductor loop is arranged in such a way that said charging conductor loop runs in a circumferential direction, that is to say in particular the aforementioned circumferential direction, about the central longitudinal axis and about the base body and/or the accumulator. In addition, depending on the application, the charging conductor loop is configured as a coil with several windings, that is to say, for example, as a cylindrical coil.

In an advantageous further development, the radio conductor loop runs on the one hand in the circumferential direction about the central longitudinal axis and about the base body and/or the accumulator, and, on the other hand, the charging conductor loop is formed in such a way that said charging conductor loop in the circumferential direction runs about the central longitudinal axis and about the base body and/or the accumulator.

Moreover, a first longitudinal section of the hearing aid module as well as a second longitudinal section of the hearing aid module typically extend along the central longitudinal axis. In this case, the second longitudinal section typically directly follows the first longitudinal section in the direction of the central longitudinal axis. It is considered advantageous in this case, when the charging conductor loop is arranged in the first longitudinal section, and when the radio conductor loop is arranged in the second longitudinal section. In this case, the charging conductor loop and the radio conductor loop are preferably arranged next to one another as seen in the direction of the central longitudinal axis. In addition, the charging conductor loop and the radio conductor loop are preferably spatially separated from one another and accordingly, a distance between the charging conductor loop and the radio conductor loop is provided and left, viewed in the direction of the central longitudinal axis.

It is also useful if the charging conductor loop abuts the accumulator or the aforementioned base body. The charging conductor loop is then, for example, directly applied to the accumulator or the base body, for example printed or wound. According to an embodiment variant, the charging conductor loop is glued onto the accumulator or the base body.

According to an alternative embodiment variant, the charging conductor loop abuts the accumulator or the aforementioned base body with an additional element in between. A corresponding additional element is then formed, for example, by a coating or a film or has a coating or a film. Further preferably such additional element is made of a ferrimagnetic, in particular a soft magnetic ferrimagnetic material or has a structure or component made of such material. In this case, the additional element is made of a ferrite, for example. The magnetic permeability $\mu_{base\ body}$ of a corresponding aforementioned additional element is preferably in a range between 5 and 300 and more preferably in a range between 5 to 100.

A design is also typical in which the hearing aid module has a shielding body, in particular a shielding body that separates the charging conductor loop and the radio conductor loop. A corresponding shielding body is, for example, a hollow cylindrical body, depending on the configuration. The shielding body typically has conductor material or is made of a conductor material and is used for electromagnetic shielding. Copper or a copper alloy, for example, is expedient as the conductor material. According to an embodiment variant, a film, that is to say a shielding film, forms the shielding body, wherein the film in this case is made, for example, of copper or a copper alloy. According to a further embodiment variant, the shield body has a conductor structure or a conductor layer, for example a metallic layer or coating, for electromagnetic shielding.

One configuration is also advantageous in which the charging conductor loop abuts the above-described shielding body or, vice versa, in which the shielding body abuts the charging conductor loop. According to a design, the shielding body is glued onto the charging conductor loop.

Furthermore, it is expedient when the hearing aid module has an auxiliary body in which at least a partial volume typically has ferrimagnetic, in particular soft magnetic ferrimagnetic properties. A corresponding auxiliary body is, for example, a hollow cylindrical body, depending on the configuration. The auxiliary body usually has ferrimagnetic, in particular soft magnetic ferrimagnetic material or is fabricated, for example, of a ferrimagnetic, in particular a soft magnetic ferrimagnetic material. According to an embodiment variant, a film, that is to say an auxiliary film, forms the auxiliary body, the film being made of a ferrimagnetic, in particular a soft magnetic ferrimagnetic material, for example. According to a further embodiment variant, the auxiliary body has an auxiliary structure or an auxiliary layer which is made, for example, of a ferrimagnetic, in particular a soft magnetic ferrimagnetic material or at least has ferrimagnetic, in particular soft magnetic ferrimagnetic properties.

Depending on the configuration variant, the radio conductor loop abuts the above-described auxiliary body. In this case, the radio conductor loop is, for example, directly applied to the auxiliary body, for example, printed, or wound. According to an embodiment variant, the radio conductor loop is glued onto the auxiliary body.

If provision is made for a corresponding auxiliary body, then the auxiliary body is preferably positioned, applied or wound on an above-described shielding body. In this case, according to an embodiment variant, the auxiliary body is glued onto the shielding body.

It is also advantageous when the above-described auxiliary body separates the charging conductor loop and the radio conductor loop.

According to a further embodiment variant, the hearing aid module has a module body which forms the aforementioned shielding body and/or the aforementioned auxiliary body. Such a module body then has for example several layers, in particular in sandwich construction, wherein, for example, a layer for electromagnetic shielding has a conductor structure or a conductor layer, and wherein a layer forms an abovementioned auxiliary layer, which is, for example, made of a ferrimagnetic, in particular a soft magnetic ferrimagnetic material or at least has ferrimagnetic, in particular soft magnetic ferrimagnetic properties.

In an advantageous further development, the above-described module body also has the radio conductor loop and/or the charging conductor loop, the radio conductor loop and/or the charging conductor loop being designed, for example, as conductor tracks.

Notwithstanding the above, a first radial section of the hearing aid module, which has, in particular, a cylindrical or hollow cylindrical shaped volume, extends generally in a radial direction transverse to the central longitudinal axis. A typical further configuration has the charging conductor loop arranged in the first radial section. In this case, the charging conductor loop is, for example, directly printed on the accumulator or the base body, or the charging conductor loop is, for example, wound directly on the accumulator or base body.

Notwithstanding the above, the maximum extension of the conductor cross-section (in the case of a round cross-section, the diameter) of the loading conductor loop is typically in the range 20 μm to 500 μm, preferably in the range 30 μm to 300 μm, and especially in the range 40 μm to 100 μm. In this case, the conductor cross-section of the charging conductor loop is usually substantially constant over the course of the charging conductor loop. Copper is preferred as the conductor material for the charging conductor loop. Other materials that are conductive and have practically no magnetic permeability, are also expedient.

In the case of most embodiment variants, the aforementioned first radial section is followed by an intermediate section of the hearing aid module in the radial direction, which in turn is followed by a second radial section of the hearing aid module. The radio conductor loop is then usually arranged in the second radial section.

In particular, a configuration of the hearing aid module is preferred in which the charging conductor loop is arranged in the first radial section and in which the radio conductor loop is arranged in the second radial section. The charging conductor loop and the radio conductor loop are then typically spaced apart, viewed in the radial direction, wherein the charging conductor loop is typically positioned closer to the central longitudinal axis than the radio conductor loop.

Notwithstanding the above, the maximum extension of the conductor cross-section of the radio conductor loop (in the case of a round cross-section, the diameter) is preferably in the range 10 μm to 100 μm, and more preferably in the range 30 μm to 60 μm. In this case, the conductor cross-section of the radio conductor loop is usually substantially constant over the course of the radio conductor loop. Copper is also preferred as the conductor material for the radio conductor loop.

Furthermore, an embodiment variant is advantageous, in which the abovementioned auxiliary body is arranged in the above-described intermediate section. In this case, the auxiliary body extends, viewed in the direction of the central longitudinal axis, preferably only across the second longitudinal section, wherein the extension, viewed in the direction of the central longitudinal axis, more preferably approximately corresponds to the extension of the radio conductor loop, viewed in the direction of the central longitudinal axis.

Notwithstanding the above, as previously stated above, an auxiliary film preferably forms the auxiliary body, or the auxiliary body has an auxiliary structure or an auxiliary layer which has ferrimagnetic, especially soft magnetic, ferrimagnetic properties. In this case, further preferably the auxiliary film, the auxiliary structure or the auxiliary layer has a thickness, strength or extension in the radial direction in the range of 20 μm to 300 μm, and more particularly 30 μm to 200 μm. It is therefore in particular a very thin film, auxiliary structure or auxiliary layer with a small extension in the radial direction. It is also considered to be expedient if the radio conductor loop is applied or wound directly onto the auxiliary film, auxiliary structure or auxiliary layer.

As already stated above, in the case of some embodiment variants, provision is made for the previously described base body, which is made in particular of a ferrimagnetic material and in particular a soft magnetic ferrimagnetic material. If then provision is made for the above-described auxiliary body, an auxiliary body is preferably used for the hearing aid module, the magnetic permeability of which is greater than the magnetic permeability of the base body. In the context of this application, the magnetic permeability of the auxiliary body is understood to mean in particular the magnetic permeability of the above-described auxiliary film, auxiliary structure or auxiliary layer. The magnetic permeability of the base body $\mu_{base\ body}$ lies, for example, in the range 5 to 100, whereas the magnetic permeability $\mu_{auxiliary\ film}$ of the auxiliary film or the auxiliary body preferably is in the range 30 to 1000. In addition, auxiliary film is greater than $a*\mu_{base\ body}$ with a value of a in the range 2 to 20 and in particular in the range 5 to 10.

Furthermore, it is advantageous if the above-described shielding body is arranged in the intermediate section. In this case, the shielding body is arranged in some cases in such a way that a distance in a radial direction is predetermined between the shielding body and the charging conductor loop. In this case, the corresponding distance is then implemented, for example, by means of a PET film and in particular by means of a so-called Kapton film, which is arranged between the shielding body and the charging conductor loop. Alternatively, a corresponding distance is implemented by means of a lacquer layer.

Notwithstanding the above, the aforementioned shielding body further preferably extends, viewed in the direction of the central longitudinal axis, both across the first longitudinal section and across the second longitudinal section. Alternatively, it extends only over the second longitudinal section.

As already stated above, a shielding film preferably forms the shielding body or the shielding body has a conductor structure or a conductor layer, for example a metallic layer or coating. The shielding film, the conductor structure or the conductor layer in this case has preferably a thickness, strength or extension in the radial direction in the range of 10 μm to 200 μm, and more particularly in the range of 20 μm to 100 μm. It is therefore in particular a very thin film, conductor structure or conductor layer with a small extension in the radial direction.

According to an embodiment variant, the shielding film, the conductor structure or conductor layer in addition has a number of recesses or openings, for example, round, oval or angular-shaped holes, the recesses preferably forming a perforation, which then typically extends across the entire circumference in the circumferential direction and preferably across the first longitudinal section and in particular only across the first longitudinal section. In this case, the number of recesses is typically greater than 10 and in particular greater than 50. It is usually in the range from 50 to 1000.

According to a further embodiment variant, the shielding body and in particular the shielding film, the conductor structure or the conductor layer form a gap extending in the direction of the central longitudinal axis, which gap in particular extends over the entire extension of the shielding body, the shielding film, the conductor structure or the conductor layer in the direction of the central longitudinal axis. Depending on the embodiment variant, such a gap is then supplemented by a switchable bridge circuit, which is formed in such a way that the gap can be bridged via the bridge circuit. That is to say that the bridge circuit bridges or short-circuits the two edges of the gap in a switching state.

If provision is made for both a shielding body and an auxiliary body then the auxiliary body preferably rests directly on the shielding body, for example, wound onto the shielding body. The shielding body is then typically closer to the central longitudinal axis than the auxiliary body.

As an alternative or in addition to the shielding body, provision is made in at least one embodiment variant for a switchable short-circuit conductor loop. The short-circuit conductor loop is then typically arranged in the intermediate section. More preferably, it has a number of windings, which are then usually routed in the circumferential direction about the central longitudinal axis and about the accumulator or the base body. In addition, the short-circuit conductor loop forms preferably a kind of coil, in particular a type of cylindrical coil which preferably extends across the first longitudinal section, and in particular only across the first longitudinal section. If the short-circuit conductor loop is in the short-circuited switching state, the short-circuit conductor loop shields the charging conductor loop from the radio conductor loop.

An above-described hearing aid module also preferably has an outer jacket, casing or coating, by means of which the hearing aid module is at least partially closed off from the outside and in particular is closed off from the outside in a liquid-tight manner. A corresponding outer jacket, casing or coating can be formed, for example, by dipping.

Other features which are considered as characteristic for the invention are set forth in the appended claims.

Although the invention is illustrated and described herein as embodied in a hearing aid, a hearing aid set and hearing aid module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
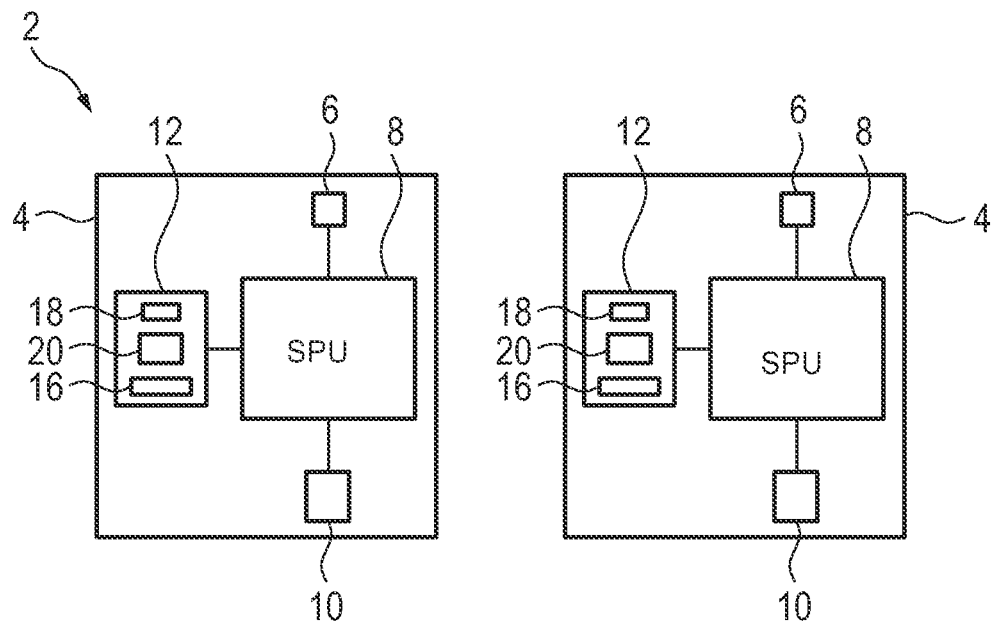
FIG. 1 is a block diagram showing a binaural hearing aid set with two hearing aids, each hearing aid having a hearing aid module, according to the invention.

Corresponding parts are provided with the same reference numerals in each of the figures.

Referring now to the figures of the drawings in detail and first, particularly to FIG. 1 thereof, there is shown a binaural hearing aid set 2, described below by way of example, is shown schematically in FIG. 1 and has two hearing aids 4, namely a hearing aid 4 for a left ear and a hearing aid 4 for a right ear. In this case, each of the two hearing aids 4 has a number of components or assemblies, including an input transducer 6, typically a microphone, a control and data processing unit 8 as well as an output transducer 10, for example a loudspeaker.

In addition, each of the two hearing aids 4 has a hearing aid module 12 which is formed to supply the respective hearing aid 4 with electrical energy. In the exemplary embodiment, components of such a hearing aid module 12 are, inter alia, a base body 14, a charging conductor loop 16 and a radio conductor loop 18, which together with further components form an assembly of the hearing aid module 12, which is shown in FIG. 2 to FIG. 8 in different embodiment variants.

Common to these embodiment variants is the configuration of the base body 14 as a cylinder-shaped base body 14 with a hollow interior shown in FIG. 5 to FIG. 8 in which an accumulator 20 is arranged in the finished state of the hearing aid module 12. Furthermore, the base body 14 in all embodiment variants shown here, is made of a soft magnetic ferrimagnetic material with a magnetic permeability $\mu_{base\ body}$ of 50, for example, extending along a central longitudinal axis 22.

Figure 5:
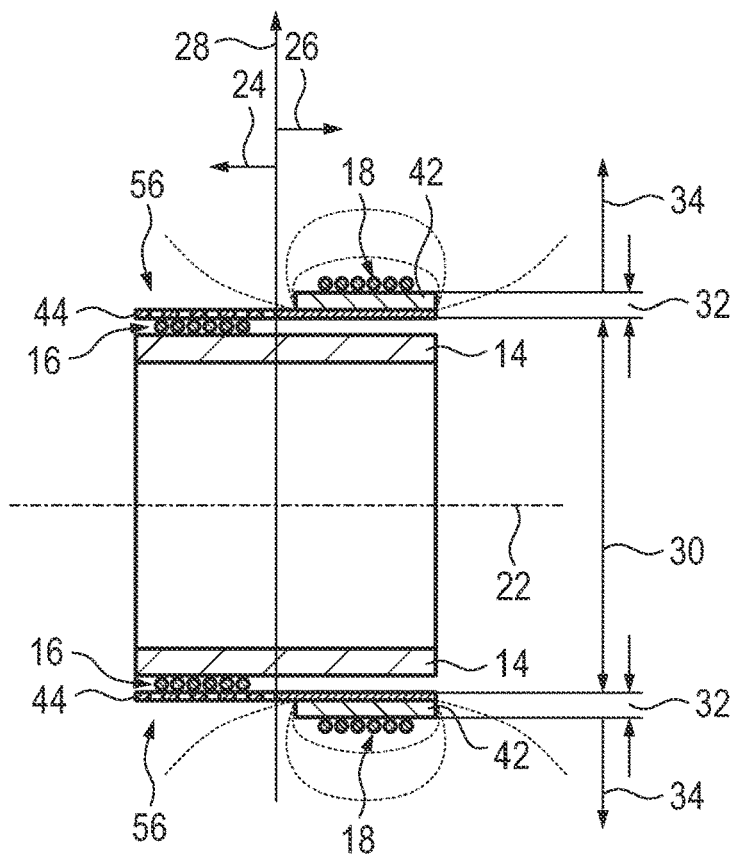
FIG. 5 is a sectional view of the assembly of the hearing aid-hearing aid module in a fourth embodiment without an accumulator.

Starting from this central longitudinal axis 22, a first longitudinal section 24 extending along the central longitudinal axis 22, as well as a second longitudinal section 26 following in the direction of the central longitudinal axis 22 can be assigned to the hearing aid module 12, see FIG. 5. In addition, a first radial section 30 extending in a radial direction 28 transversely to the central longitudinal axis 22, an intermediate section 32 following in the radial direction 28, as well as a second radial section 34 following in the radial direction 28 can be assigned to the hearing aid module 12. In this case, the intermediate section 32 and the second radial section 34 form a hollow cylindrical volume in each case and the first radial section forms a cylindrical volume. This division into sections is indicated in FIG. 5 and applied for almost all embodiment variants shown or described here.

Figure 2:
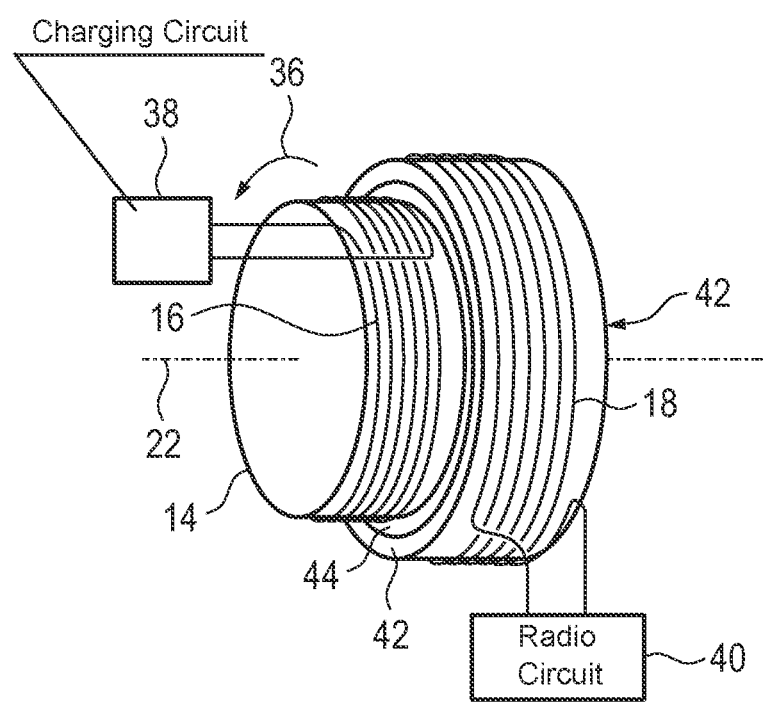
FIG. 2 is a diagrammatic, perspective view of an assembly of the hearing aid module in a first embodiment.

FIG. 2 now shows a first embodiment of the assembly with the base body 14, the charging conductor loop 16 and the radio conductor loop 18. In this case, the two conductor loops 16, 18 form in each case a cylindrical coil with several windings, the windings running in a circumferential direction 36 about the central longitudinal axis 22 and about the base body 14.

Notwithstanding the exact configuration of the hearing aid module 12, the charging conductor loop 16 is part of a charging circuit 38. In this case, said charging circuit 38 is preferably formed for inductive charging of the accumulator 20. Thus, a corresponding hearing aid 4 is typically formed for an inductive charging. In contrast, the radio conductor loop 18 is part of a transmitting and receiving unit which is usually formed for communication between the hearing aids 4 of the hearing aid set 2. In the exemplary embodiment, the control and data processing unit 8 forms a radio circuit 40 which can be controlled by the control and data processing unit 8, and the radio conductor loop 18 which is part of the radio circuit 40, forms the transmitting and receiving unit.

In the embodiment variant according to FIG. 2, the windings of the charging conductor loop 16 are now wound around the base body 14 and thus rest directly on the base body 14. In this case, the windings of the charging conductor loop 16 are arranged in the first longitudinal section 24. In contrast, the windings of the radio conductor loops 18 are arranged in the second longitudinal section 26 and thus the two conductor loops 16, 18, viewed in the direction of the central longitudinal axis 22, are arranged side by side and spatially separated in this way.

In the exemplary embodiment according to FIG. 2, the windings of the radio conductor loop 18 are wound onto an auxiliary film 42 positioned in the intermediate section 32 and thus directly on the auxiliary film 42. In this case, the auxiliary film 42, like the base body 14, is made of a soft magnetic ferrimagnetic material. However, the magnetic permeability $\mu_{auxiliary\ film}$ of the auxiliary film 42 is larger than the magnetic permeability $\mu_{base\ body}$ of the base body 14 and in the exemplary embodiment has a value of 500, for example. In addition, the auxiliary film 42 is 100 μm thick in the exemplary embodiment.

Furthermore, the auxiliary film according to FIG. 2 itself is wound onto a shielding film 44 with a thickness of 50 μm, which is also arranged in the intermediate section 32 and consists of an electrically conductive material, for example copper. In this case, in the case of the embodiment according to FIG. 2, the auxiliary film 42 extends, viewed in the direction of the central longitudinal axis 22, only across the second longitudinal section 26, whereas the shielding film 44 extends, viewed in the direction of the central longitudinal axis 22, across the first longitudinal section 24 and across the second longitudinal section 26.

Figure 3:
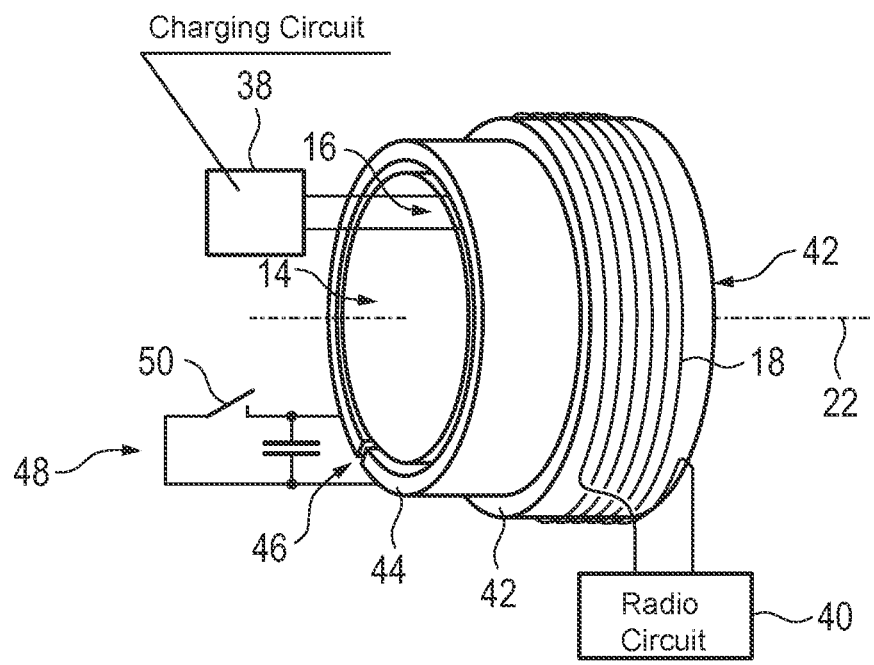
FIG. 3 is a perspective view of the assembly of the hearing aid module in a second embodiment.

A second embodiment variant of the assembly shown in FIG. 2 is depicted in FIG. 3. In this case, the shielding film 44 according to FIG. 3 differs from the embodiment according to FIG. 2 in that it forms a gap extending in the direction of the central longitudinal axis 22, which gap extends across the entire extension of the shielding film 44 in the direction of the central longitudinal axis 22. In this case, the gap 46 in the embodiment variant shown can be bridged or short-circuited by a switchable bridge circuit 48, wherein the bridge circuit 48 has a switch 50 for this purpose, which can be controlled by the control and data processing unit 8. In this case, the control of the switch 50 takes place in such a way that it is closed when the radio conductor loop 18 is used for communication and is open when the charging conductor loop 16 is utilized to charge the accumulator 20.

A simultaneous utilization of charging conductor loop 16 and the radio conductor loop 18 is typically not provided irrespective of the configuration of the hearing aid module 12 and in the case of some embodiment variants excluded by constructive measures and/or a suitable programming.

Figure 4:
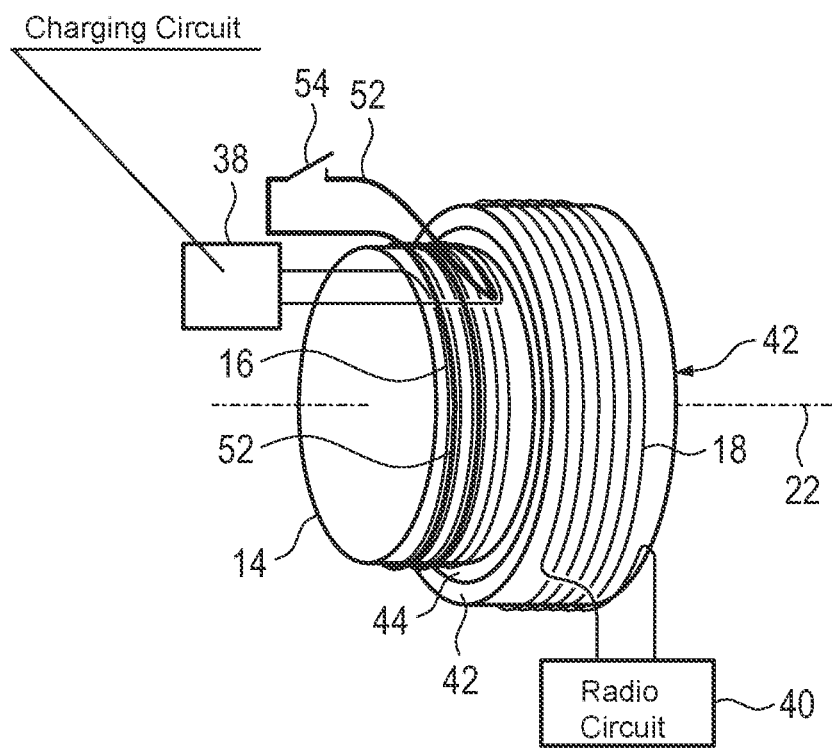
FIG. 4 is a perspective view of the assembly of the hearing aid module in a third embodiment.

Another variant of the hearing aid module 12 is indicated in FIG. 4. In this case, the shielding film 44 extends only across the second longitudinal section 26. The shielding film 44 is supplemented in this case by a switchable short-circuit conductor loop 52 having multiple windings. Starting from the central longitudinal axis 22, the windings are preferably arranged in a plane above the charging conductor loop 16, that is to say in the intermediate section 32. To implement a radial distance between the charging conductor loop 16 and the short-circuit conductor loop 52, a lacquer layer (not shown) or a film, for example made of PET, is positioned between them, for example. Part of this short-circuit conductor loop 52 in turn is a switch 54 which can be controlled by the control and data processing unit 8 and is controlled analogously to the switch 50 in the case of the embodiment according to FIG. 3.

Figure 6:
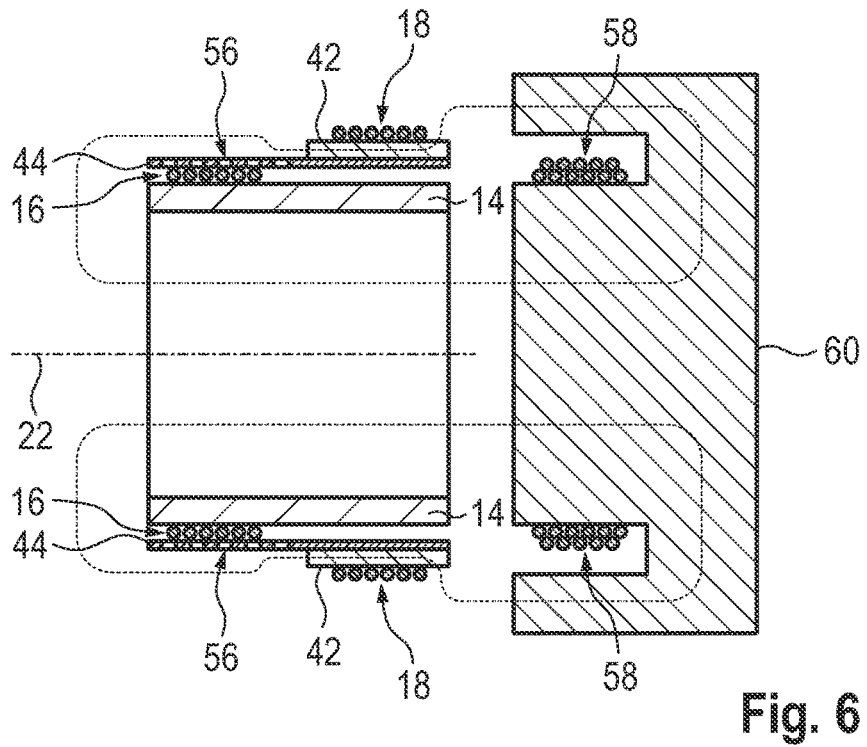
FIG. 6 is a sectional view of the assembly of the hearing aid module in the fourth embodiment without an accumulator together with an assembly of a charging device.

A fourth embodiment variant is indicated in FIGS. 5 and 6. In this case, the shielding film 44 extends both across the first longitudinal section 24 and across the second longitudinal section 26. The shielding film 44, as in the case of the embodiment according to FIG. 2 does not form a gap 46 and is not even connected to a bridge circuit 48 according to FIG. 3. Instead, the shielding film 44 has a perforation 56 with a number of recesses in the first longitudinal section 24.

For this embodiment variant, field line profiles for two modes of operation of the associated hearing aid 4 are indicated in the two illustrations according to FIGS. 5 and 6, namely for a mode of operation in which the radio conductor loop 18 is utilized for communication, shown in FIG. 5, and for a mode of operation in which a coil 58 of a charging device 60 feeds the charging conductor loop 16. In both cases, the dotted lines represent sketchily the coarse profile of one or more magnetic field lines.

Figure 7:
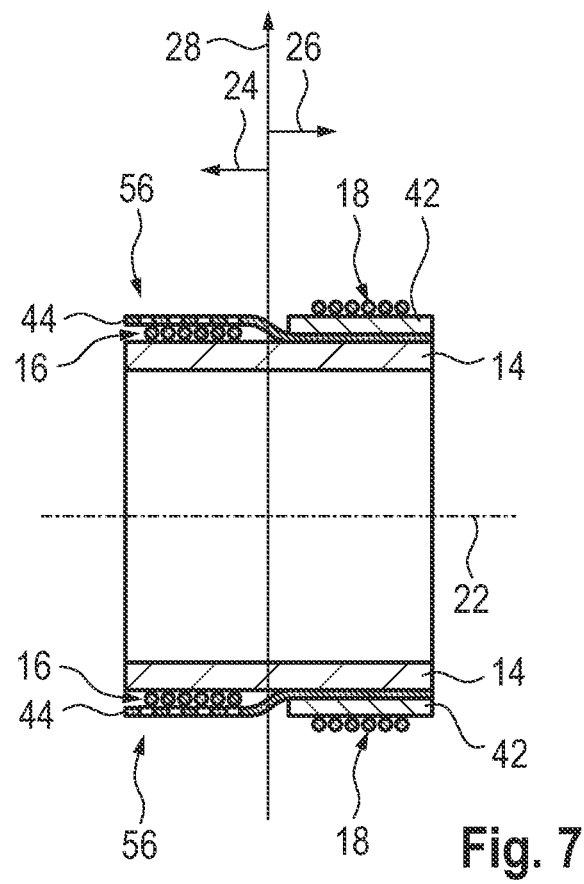
FIG. 7 is a sectional view of the assembly of the hearing aid module in a fifth embodiment without an accumulator.

A fifth embodiment variant is depicted in FIG. 7. In this case, the charging conductor loop 16 is wound directly onto the base body 14 and preferably fixed by gluing. The shielding film 44 is wound onto the assembly made of the base body 14 and charging conductor loop 16, which shielding film 44 directly abuts the base body 14 in the second longitudinal section 26 and the charging conductor loop 16 in the first longitudinal section 24 and is preferably glued. In turn, the auxiliary film 42 is wound onto the shielding film 44, and preferably glued, and the radio conductor loop 18 is wound onto the auxiliary sheet 42, and preferably glued. In this case, in the case of the embodiment of FIG. 7, the auxiliary film 42 extends, viewed in the direction of the central longitudinal axis 22, only across the second longitudinal section 26, whereas the shielding film 44, viewed in the direction of the central longitudinal axis 22, extends across the first longitudinal section 24 and across the second longitudinal section 26.

Figure 8:
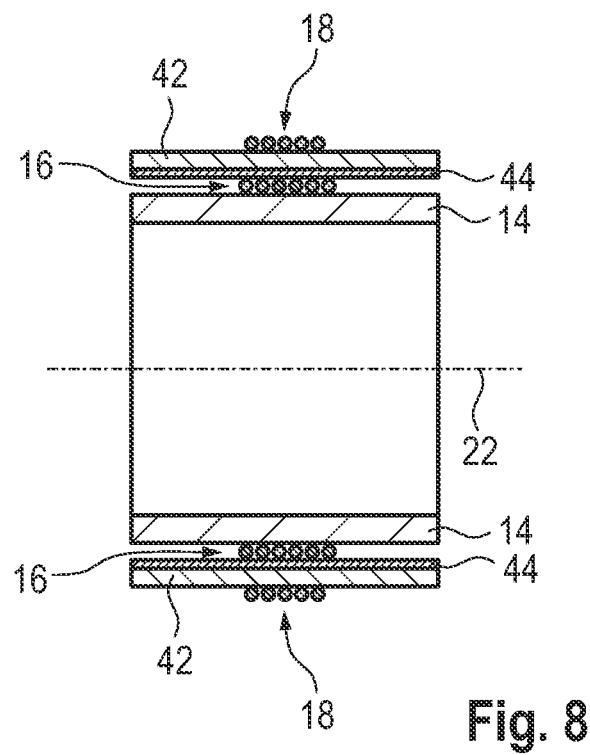
FIG. 8 is a sectional view of the assembly of the hearing aid module in a sixth embodiment without an accumulator.

Finally, a sixth embodiment variant is illustrated in FIG. 8, in which, in contrast to the above-described embodiment variants, the charging conductor loop 16 and the radio conductor loop 18 are arranged in the same longitudinal section, the two conductor loops 16, 18 being wound onto the base body 14 quasi in different layers in the circumferential direction 36. The auxiliary film 42 on the one hand and the shielding film 44 on the other hand are arranged between the two conductor loops 16, 18 so that the two conductor loops 16, 18 are also separated by the two films 42, 44. In this case, the shielding film 44 faces the charging conductor loop 16 and the auxiliary film 42 faces the radio conductor loop 18.

The following is a summary list of reference numerals and the corresponding structure used in the above description of the invention:

2 hearing aid sets
4 hearing aid
6 input transducer
8 control and data processing unit
10 output transducer
12 hearing aid module
14 base body
16 charging conductor loop 18 radio conductor loop
20 accumulator
22 central longitudinal axis
24 first longitudinal section
26 second longitudinal section
28 radial direction
30 first radial section
32 intermediate section
34 second radial section
36 circumferential direction
38 charging circuit
40 radio circuit
42 auxiliary film
44 shielding film
46 gap
48 bridge circuit
50 switch
52 short-circuit conductor loop
54 switch
56 perforation
58 coil
60 charging device

The invention claimed is:

1. A hearing aid, comprising:
a hearing aid module for supplying electrical energy and having a transmitting and receiving unit for communication with a further device, said hearing aid module further having an accumulator and a charging circuit for charging said accumulator, said charging circuit formed for contactless charging of said accumulator and having a charging conductor loop; and
said transmitting and receiving unit having a radio conductor loop, said radio conductor loop being integrated into said hearing aid module;
said accumulator extending along a central longitudinal axis with said radio conductor loop disposed running in a circumferential direction about said central longitudinal axis and about said accumulator or said hearing module having a base body extending along said central longitudinal axis with said radio conductor loop disposed running in said circumferential direction about said central longitudinal axis and about said base body.

2. The hearing aid according to claim 1, wherein:
said charging conductor loop is disposed in such a way that said charging conductor loop runs in a circumferential direction about the central longitudinal axis and about said accumulator or said base body.

3. The hearing aid according to claim 1, wherein:
said hearing aid module has a first longitudinal section and a second longitudinal section that follow a hearing aid module extent along the central longitudinal axis;
said charging conductor loop is disposed in said first longitudinal section; and
said radio conductor loop is disposed in said second longitudinal section.

4. The hearing aid according to claim 1, wherein:
said charging conductor loop abuts said accumulator or said base body.

5. The hearing aid according to claim 1, wherein said hearing aid module has a shielding body.

6. The hearing aid according to claim 1, wherein said hearing aid module has an auxiliary body in which at least a partial volume has ferrimagnetic properties.

7. The hearing aid according to claim 6, wherein said radio conductor loop abuts said auxiliary body.

8. A hearing aid, comprising:
a hearing aid module for supplying electrical energy and having a transmitting and receiving unit for communication with a further device, said hearing aid module further having an accumulator and a charging circuit for charging said accumulator, said charging circuit formed for contactless charging of said accumulator and having a charging conductor loop; and
said transmitting and receiving unit having a radio conductor loop, said radio conductor loop being integrated into said hearing aid module;
said hearing aid module having a shielding body separating said charging conductor loop from said radio conductor loop.

9. A hearing aid, comprising:
a hearing aid module for supplying electrical energy and having a transmitting and receiving unit for communication with a further device, said hearing aid module further having an accumulator and a charging circuit for charging said accumulator, said charging circuit formed for contactless charging of said accumulator and having a charging conductor loop; and
said transmitting and receiving unit having a radio conductor loop, said radio conductor loop being integrated into said hearing aid module;
said accumulator extending along a central longitudinal axis or said hearing aid module having a base body extending along said central longitudinal axis;
said hearing aid module having a first radial section extending in a radial direction transversely to the central longitudinal axis, an intermediate section following said first radial section in the radial direction and a second radial section in turn, following a said intermediate section in the radial direction;
said charging conductor loop disposed in said first radial section; and
said radio conductor loop disposed in said second radial section.

10. The hearing aid according to claim 9, further comprising a ferrimagnetic auxiliary film disposed in said intermediate section.

11. The hearing aid according to claim 10, wherein said base body is made of a ferrimagnetic material having a magnetic permeability $\mu_{base\ body}$ and the magnetic permeability $\mu_{base\ body}$ is smaller than a magnetic permeability $\mu_{auxiliary\ film}$ of said ferrimagnetic auxiliary film.

12. The hearing aid according to claim 9, further comprising a shielding film disposed in said intermediate section.

13. The hearing aid according to claim 12, wherein said shielding film has a number of recesses formed therein.

14. The hearing aid according to claim 12, wherein said shielding film has a gap formed therein extending in a direction of the central longitudinal axis.

15. The hearing aid according to claim 14, wherein said hearing aid module has a switchable bridge circuit and said gap can be bridged via said switchable bridge circuit.

16. The hearing aid according to claim 9, further comprising a switchable short-circuit conductor loop disposed in said intermediate section.

17. A binaural hearing aid set, comprising:
two hearing aids, each of said two hearing aids being formed as a hearing aid according to claim 1.

18. A hearing aid module formed for a hearing aid as well as for supplying electrical energy to the hearing aid, the hearing aid module comprising:
  an accumulator; and
  a charging circuit for charging said accumulator, said charging circuit is formed for contactless charging of said accumulator and having a charging conductor loop, said charging circuit further having a radio conductor loop to form a transmitting and receiving unit of the hearing aid;
said accumulator extending along a central longitudinal axis with said radio conductor loop disposed running in a circumferential direction about said central longitudinal axis and about said accumulator or said hearing module having a base body extending along said central longitudinal axis with said radio conductor loop disposed running in said circumferential direction about said central longitudinal axis and about said base body.

* * * * *